Patented June 19, 1928.

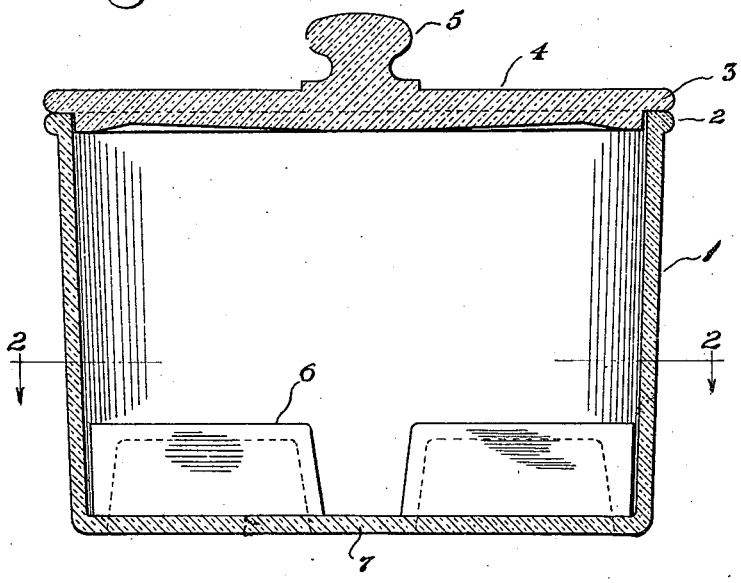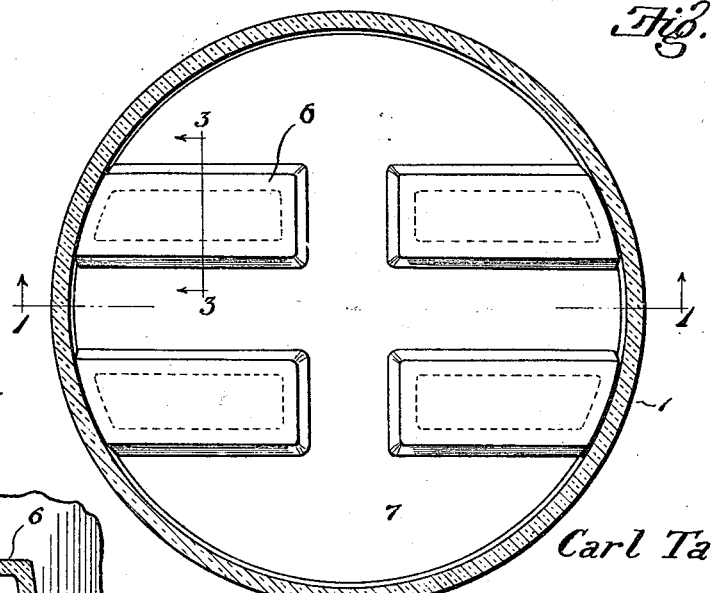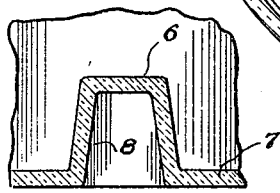

1,673,926

UNITED STATES PATENT OFFICE.

CARL TANNER, OF ALLIANCE, OHIO.

CHEESE CONTAINER.

Application filed April 27, 1925. Serial No. 25,984.

My invention relates to containers for cheese, and more particularly to a jar so constructed that cheese may be kept fresh for a long period of time.

The objects of the invention are to provide a container or jar adapted to contain a solution designed to keep cheese moist and fresh, and provided with ribs or the like arranged to support the cheese above the solution.

An embodiment of the invention is illustrated in the accompanying drawings, in which—

Figure 1 is a vertical sectional view through a cheese container embodying the invention taken substantially on the line 1—1, Fig. 2.

Fig. 2, a plan section on the line 2—2, Fig. 1, and

Fig. 3, a detail transverse section through one of the supporting ribs on the line 3—3, Fig. 2.

Similar numerals of reference indicate corresponding parts throughout the drawing.

The container is preferably in the form of a cylindrical glass jar 1 of sufficient height and diameter to accommodate a substantial piece of cheese. The mouth of the jar may be reinforced by an annular bead 2 to receive the flanged edge 3 of a cover 4 which may be provided with a suitable knob 5 for removing or replacing the same upon the jar.

Spaced pairs of integral ribs 6 are formed in the bottom wall 7 of the jar, and these ribs are preferably hollow in their under sides as shown at 8 in Fig. 3 to lighten the weight of the jar, and may be slightly tapered from bottom to top as shown.

It is well known that after cheese has been cut it is difficult to keep the same for any length of time as the natural moisture soon evaporates from the cheese and the cut surface hardens and dries, making it frequently necessary to cut away the outer surface to obtain cheese suitable for table use.

The present container overcomes this difficulty and retains the natural moisture of the cheese for an indefinite time. The bottom of the jar is adapted to be filled with a solution such as vinegar and salt to a point slightly below the level of the tops of the ribs 6, and the cheese is placed upon said ribs, being thus supported above the solution but out of contact with the same.

It has been found by experience that cheese enclosed in a container of this kind will absorb sufficient moisture from the solution to retain the cheese in its original fresh and moist condition, making it unnecessary to even cut away the outside or cut surface when it is desired to use the cheese.

Although a solution of vinegar and salt has been found best adapted to accomplish the purpose, other solutions such as salt and water or the like may be used with very good results, and the invention consists of the container adapted to support the cheese above and out of contact with the solution rather than to any particular solution.

I claim:

A cheese container comprising a jar having integral bottom and side walls, and pairs of spaced, integral, hollow, tapered ribs pressed upward in the bottom wall, the ribs being parallel to each other and extending from the side wall to a point spaced from a diameter taken perpendicular to the parallel longitudinal center lines of the ribs, the ribs supporting cheese within the jar above and out of contact with the bottom wall.

In testimony that I claim the above, I have hereunto subscribed my name.

CARL TANNER.